H. E. SLOAN.
TOOTH CUTTING MACHINE AND HOB THEREFOR.
APPLICATION FILED MAY 13, 1918.
1,372,725.  Patented Mar. 29, 1921.
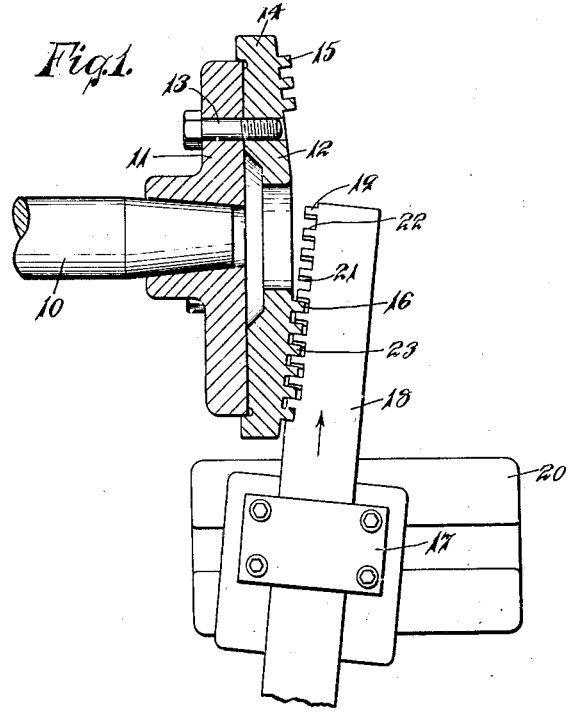
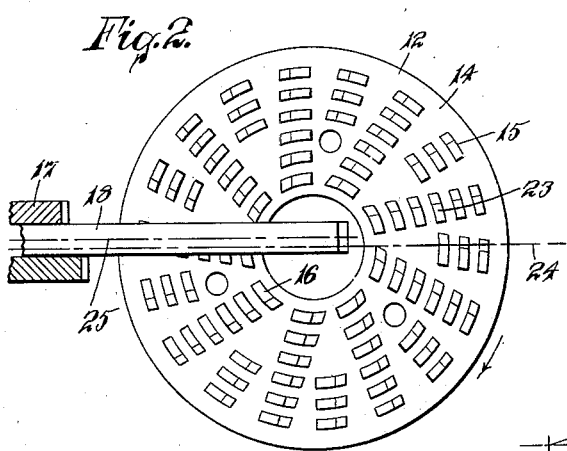
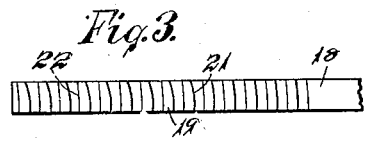
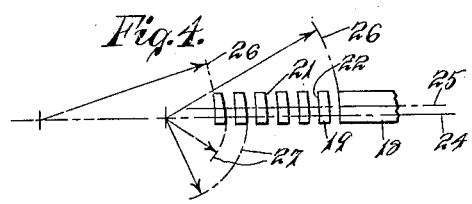
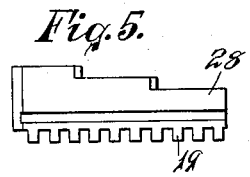
INVENTOR.
Harry E. Sloan,
BY Arthur B. Jenkins,
ATTORNEY.

UNITED STATES PATENT OFFICE.

HARRY E. SLOAN, OF HARTFORD, CONNECTICUT.

TOOTH-CUTTING MACHINE AND HOB THEREFOR.

1,372,725.  Specification of Letters Patent.  Patented Mar. 29, 1921.

Application filed May 13, 1918. Serial No. 234,050.

*To all whom it may concern:*

Be it known that I, HARRY E. SLOAN, a citizen of the United States, residing at Hartford, in the county of Hartford and State of Connecticut, have invented a new and Improved Tooth-Cutting Machine and Hob Therefor, of which the following is a specification.

My invention relates more especially to the class of tools employed for cutting teeth on the bottoms or backs of chuck jaws of the kind used in scroll chucks, and an object of my invention, among others, is to provide a tool by the use of which the speed may be greatly increased in cutting the teeth and with which the teeth may be made of extreme accuracy in form; and a further object of my invention is to provide a cutting tool by the use of which the teeth may be formed upon bars of indefinite length to be subsequently cut up into proper lengths to form chuck jaws.

One form of device embodying my invention and in the construction and use of which the objects herein set out, as well as others, may be attained, is illustrated in the accompanying drawings, in which—

Figure 1 is a view in central section through a cutter embodying my invention, shown as secured to the spindle of a lathe, and acting to cut the teeth upon a bar secured by a holder on the lathe in proper position with respect to said tool, the hob teeth in view beyond being omitted.

Fig. 2 is a view of the same parts but looking directly at the face of the hob or cutting tool.

Fig. 3 is a detail view showing a portion of a bar with teeth formed by my improved hob part way along its length.

Fig. 4 is a diagrammatic view showing the paths of travel of different rows of teeth upon my improved hob.

Fig. 5 is a detail view illustrating a chuck jaw formed from a bar upon which teeth have been cut with my improved hob.

As is well understood by those skilled in the art the jaws in scroll chucks have teeth on their backs or bottom surfaces that are engaged by a scroll comprising a rib or ribs extending in the direction of a spiral, the chuck jaws being radially disposed and held on a face plate and being radially moved on the face plate by a rotating movement of the spiral.

In cutting these jaw teeth it has heretofore been a common practice to use a hob, having teeth upon its flat face extending in the same direction as that of the spiral employed to feed the jaws in the completed chuck, the teeth in fact being formed on the hob or cutter by cutting at frequent intervals across a spirally formed rib to produce teeth comparatively short in a direction lengthwise of the spiral. In the cutting operation with such prior hob each chuck jaw is subjected separately to the cutting action of the hob, that is secured to a spindle and rotated thereby, the chuck jaw being fed across the hob radially toward the center thereof, a shallow cut being effected at each feeding operation, and all the teeth being partially cut at each of such feeding movements. The jaw holder is indexed between each of the feeding operations to produce cutting action of the hob, the latter being of a size to effect cutting action upon all of the teeth of the jaw before said jaw has been moved in the feeding action far enough to touch the teeth on the opposite side of the axial center of the hob from that on which the teeth that are effecting the cutting operation are located.

In this cutting operation with the teeth of the hob arranged in spiral lines, although the teeth are comparatively short as compared with the length of the spiral, yet they are of an appreciable length in this direction and it will, therefore, readily be seen that when the cutting is effected first at the outer edge of the hob and thence inwardly, and the advancing ends of the hob teeth consequently are toward the outer end of the spiral, the spiral curve on which the hob teeth are formed necessarily decreases as to its radius and the back of each tooth, therefore, traveling on a smaller curve than the front thereof, will have a binding action at its back in the groove being cut to form the teeth on the back of the jaw, and the longer the teeth in the direction of length of the spiral the greater will be this binding action.

In my improved hob I arrange the teeth concentric with the axis upon which the hob turns, with a result that the sides of each tooth at the fronts and backs thereof, traveling on the same circle, avoid the binding action hereinabove mentioned. However, in order to produce the teeth on the backs of the jaws to receive the spiral thread that is to subsequently operate upon them in the chuck bodies, I arrange the holder for the jaw or bar to receive the cutting action of the hob so that a plane passing lengthwise through the center of said bar in the direction of depth of its teeth will not be coincident with a plane passing radially through the hob when secured to a lathe spindle, and as illustrated by the broken lines in Fig. 2, that is, the bar is, when so held, off the radius of the hob.

My improved hob and means for properly holding the jaw or bar for action thereby, are illustrated in the accompanying drawings, the numeral 10 indicating the spindle of a lathe, many of the types of which in common use will be suitable for the purpose in hand. It will be understood that the spindle will be rotated by any suitable mechanism, and may have a face plate 11 secured thereto to support my improved hob 12 that may be affixed in place in any suitable manner, bolts 13 being shown herein for this purpose.

My improved hob embodies a base plate 14 the front face of which is transversely arranged to the axis of said spindle and from which face rows 15—16 of forming teeth project substantially in the same direction as the axis of said spindle, each row forming one side of each tooth on the jaw or bar and both rows being concentrically formed upon the base plate. A clamp plate 17, of any suitable construction, is employed to hold a bar 18 upon which teeth 19 are to be cut by my improved hob.

In cutting the teeth 19, the bar 18 will be positioned so that the tooth thereon at one extreme end will first be formed by one of the rows of teeth 15 or 16, depending upon the direction in which said bar is moved as the teeth thereon are successively cut, a carrier 20 supporting the clamp, or the spindle supporting the hob, either or both, being fed to cause the bar and the hob to approach one another to effect the cutting operation. In the structure shown herein the bar or jaw is moved so that the row of hob teeth 15 begins the cutting operation and the carrier 20 will be moved, as by a screw or other feeding device, common to lathes, to feed the bar or jaw 18 toward the hob. In this cutting operation when a tooth has been cut to its full depth, the carrier will be operated to move the bar or jaw away from the hob, the clamp will then be indexed to bring a new portion of the bar into position for the formation of the next tooth thereon, the carrier will be fed toward the hob to cut this tooth, and the operation will be repeated until the desired number of teeth have been formed on the bar 18.

The hob teeth 16 are disposed on a circle of less radius than the hob teeth 15 and, therefore, act to cut away one side 21 of each of the teeth 19 on the bar, while the opposite side 22 of each of the teeth on the bar will remain in the shape created by the hob teeth 15, when the teeth on the bar are formed by a movement thereof in a direction indicated by the arrow in Fig. 1. This is illustrated in the diagrammatic view shown in Fig. 4 in which the dotted lines 26 illustrate paths of travel of the hob teeth 15 in forming successive teeth 19 on the bar with their edges on one side parallel, while the dotted lines 27 illustrate the paths of travel of different rows (to be hereinafter described) of hob teeth for forming the opposite sides of the teeth on the bar, from which it will be seen that each row of hob teeth operating upon the bar of jaw teeth travels on a circle of shorter radius than the row or rows previously acting upon the bar teeth. In order to lessen the work of the hob teeth 16 I provide a number of intermediate rows 23 of such teeth on the base plate 14, these rows being concentrically formed between the rows of teeth 15 and 16. When the cutting operation is performed in a movement of the bar in the direction opposite to that indicated by the arrow in Fig. 1, the sides 21 of the teeth 19 on the bar will be completely formed at the first cut and the sides 22 of said teeth will be gradually formed by the succeeding rows of teeth 23 until this side finally receives the form shown in Fig. 3 of the drawings. This arrangement of a number of rows of finishing hob teeth results in the gradual cutting away of one side 21 or 22 of the teeth 19, depending upon the direction of movement of the bar 18, and obviates all of the finishing work being done at one operation by the last row of hob teeth, although the result may be obtained with only the two rows of teeth 15 and 16.

In order that the teeth 19 on the bar 18 shall be so shaped as to receive a feeding thread of spiral form in the chuck of which the jaws to be formed from the bar 18 are to eventually comprise a part, said bar is located off the radius of the hob, it being so located, in the cutting operation, that a plane passing centrally through it in the direction of depth of its teeth will not be coincident with a radius 24 of the hob. This bar may be arranged as illustrated in Fig. 2 of the drawings, in which the center line 25 of the bar is shown as slightly at one side of the line 24 denoting the radius of the hob. This disposition of the bar 18 and the formation of the teeth 15 and 16, causes the teeth 19 on the bar to be so shaped that they will receive the spirally extending feed rib of a scroll chuck for feeding movement thereby.

In order that a bar 18 of indefinite length may have teeth cut on one edge thereof, I form the base plate 14 of conical shape and so locate the clamp 17 that the bar 18 will be disposed practically parallel with the conical face of the plate 14, as shown in Fig. 1 of the drawings. From this it will be seen that the teeth may be formed upon bars 18 of any length that may be desired, said bars, when they have been sufficiently moved lengthwise, passing over the tops of the teeth on the opposite side of the hob from that at which the cutting is taking place, and such bars may then be cut up into proper lengths to form a number of the jaws 28, illustrated in Fig. 5 of the drawings.

In accordance with the provisions of the patent statutes I have described the principles of operation of my invention, together with the device which I now consider to represent the best embodiment thereof, but I desire to have it understood that the device shown is only illustrative and that the invention may be carried out by other means within the scope of the appended claims.

I claim:—

1. A hob comprising a base plate, and a plurality of rows of cutting teeth concentrically formed upon said plate, said rows of teeth being of different diameters.

2. A hob comprising a base plate having an inclined face, and teeth of substantially the same depth disposed upon the face of said plate in a plurality of rows concentric with the axis thereof.

3. A hob comprising a base plate having a conical shaped face, and a plurality of rows of teeth concentrically formed upon said plate, each row to cut a circular groove.

4. A tooth cutting machine comprising a hob having a row of cutting teeth concentrically formed thereon, means for rotating the hob, and means for holding a piece of material off the radius of said hob to produce a spiral groove therein by cutting action of said hob.

5. A tooth cutting machine comprising a hob having a front face transversely disposed to its axis and with a plurality of rows of cutting teeth concentrically formed thereon, said teeth extending substantially in the same direction as said axis, means for rotating the hob, and means for holding a piece of material off the radius of said hob.

6. A tooth cutting machine comprising a hob having a front face transversely disposed to its axis and with a row of cutting teeth concentrically formed thereon, said teeth extending substantially in the same direction as said axis, means for rotating the hob, and means for holding a piece of material so that a plane passing in the direction of depth through its lengthwise center line will not be coincident with the radius of said hob, whereby a spiral groove is cut by said concentric arrangement of teeth.

7. A tooth cutting machine comprising a hob having a front face transversely disposed to its axis and with a row of teeth concentrically formed thereon, said teeth extending in substantially the same direction as said axis, means for rotating the hob, and means for holding a piece of material off the radius of said hob and at an angle to the axis thereof, whereby a spiral groove is cut by said concentric arrangement of teeth.

8. A tooth cutting machine comprising a hob having a front face transversely disposed to its axis and with a plurality of rows of cutting teeth concentrically formed thereon, said teeth extending in substantially the same direction as said axis, means for rotating the hob, and means for holding a piece of material at an angle to the axis of said hob and with a plane extending in the direction of depth lengthwise through its center located at one side of the radius of said hob.

9. A hob comprising a base plate, and a plurality of rows of cutting teeth concentrically formed thereon and including a plurality of rows of such teeth arranged transversely to said concentric rows on the face of said base plate.

HARRY E. SLOAN.